(12) United States Patent
Shih et al.

(10) Patent No.: US 8,231,300 B2
(45) Date of Patent: Jul. 31, 2012

(54) ARCHITECTURE AND COMPONENT STRUCTURE THEREOF

(75) Inventors: Naai-Jung Shih, Taipei (TW); Chih-Ming Chien, Taipei (TW)

(73) Assignee: National Taiwan University of Science & Technology, Taipei (TW)

( * ) Notice: Subject to any disclaimer, the term of this patent is extended or adjusted under 35 U.S.C. 154(b) by 1075 days.

(21) Appl. No.: 11/970,969

(22) Filed: Jan. 8, 2008

(65) Prior Publication Data
US 2008/0273920 A1    Nov. 6, 2008

(30) Foreign Application Priority Data
May 4, 2007 (TW) .............................. 96115862 A (51) Int. Cl.
*F16C 11/00* (2006.01)
(52) U.S. Cl. .......................................... 403/61; 403/116
(58) Field of Classification Search .................. 403/61, 403/62, 116
See application file for complete search history.

(56) References Cited

U.S. PATENT DOCUMENTS

| | | | | |
|---|---|---|---|---|
| 1,039,986 A * | 10/1912 | Merritt | ............ | 403/61 |
| 1,091,332 A * | 3/1914 | Hart | ............ | 403/61 |
| 2,684,257 A * | 7/1954 | Roethel | ............ | 403/61 |
| 2,772,901 A * | 12/1956 | Roethel | ............ | 403/61 |
| 3,458,949 A * | 8/1969 | Young | ............ | 446/124 |
| 3,747,261 A | 7/1973 | Salem | | |
| 5,030,103 A * | 7/1991 | Buist et al. | ............ | 434/278 |
| 5,095,677 A * | 3/1992 | Godbout et al. | ............ | 403/176 |
| 6,419,395 B1 * | 7/2002 | Taylor | ............ | 403/61 |

FOREIGN PATENT DOCUMENTS

| | | |
|---|---|---|
| JP | 2004-298531 A | 10/2004 |
| TW | M284426 | 1/2006 |

OTHER PUBLICATIONS

Sass, L. "Design for Self Assembly of Building Components using Rapid Prototyping", In proceedings of the eCAADe'04 "Architecutre in the network society", Sep. 15-18, 2004, pp. 95-104, Portugal.

Sass, L. "Design Production: Constructing freedom designs with rapid prototyping", In procedings of the eCAADe'05 "Digital Design: the quest for new paradigms", Sep. 17-20, 2005, pp. 261-268, Denmark.

Sass, L. "Materializing design: the implications of rapid prototyping in digital design", Journal of Design Studies, 2006, pp. 325-355, Great Britain.

Sass, L. "Rulebuilding: A Generative Approach to Modeling Architecture using 3D printers", In proceedings of the ACADIA '04 "Fabricating: Examining the digital practice of architecture", Jul. 2-5, 2004, pp. 176-185, Canada.

* cited by examiner

*Primary Examiner* — Victor MacArthur (57) ABSTRACT

A component structure is provided, which comprises a first connection unit, at least one short rod, a second connection unit and at least one long rod. The short rod is connected to the first connection unit. The long rod is connected to the second connection unit. The main rod connects the first connection unit and the second connection unit.

21 Claims, 12 Drawing Sheets

ARCHITECTURE AND COMPONENT STRUCTURE THEREOF

BACKGROUND OF THE INVENTION

1. Field of the Invention

The invention relates to a component structure, and more particularly to a component structure for building a decorative structure.

2. Description of the Related Art

Taiwan Patent M284426 discloses a conventional component structure, or component structure of intelligent model toys. The conventional component structure comprises bendable connection units and rods for building various decorative models.

However, in Taiwan Patent M284426, the length of the rods cannot be changed by the user. Curved surfaces, thus cannot be formed by the component structures. Additionally, the connection units of the component structures are easily worn out by elastic fatigue and deterioration.

BRIEF SUMMARY OF THE INVENTION

A detailed description is given in the following embodiments with reference to the accompanying drawings.

A component structure is provided, which comprises a first connection unit, at least one short rod, a second connection unit and at least one long rod. The short rod is connected to the first connection unit. The long rod is connected to the second connection unit. The main rod connects the first connection unit and the second connection unit.

The component structure of the invention provides improved freedom in building a decorative structure (architecture). After the decorative structure is completed, curves of the decorative structure can still be modified by pivoting the linkages or rods of the invention. Additionally, the linkages or rods are connected to the connection units by bolts. Therefore, there is no elastic fatigue or deterioration problem.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
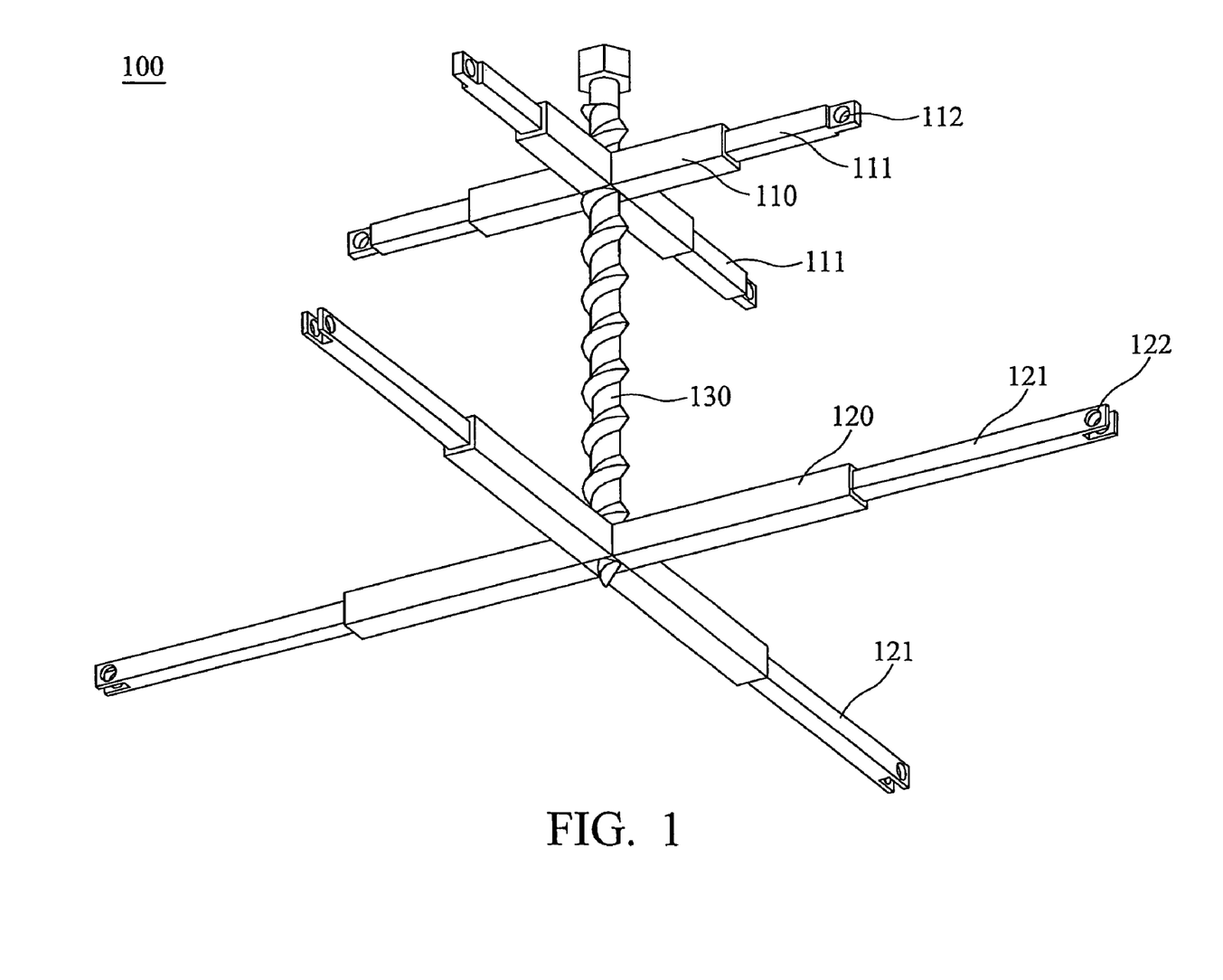
FIG. 1 shows a component structure of a first embodiment of the invention.

FIG. 1 shows a component structure 100 of a first embodiment of the invention, which comprises a first connection unit 110, short rods 111, a second connection unit 120, long rods 121 and a main rod 130. The short rods 111 are connected to the first connection unit 110. The long rods 121 are connected to the second connection unit 120. The main rod 130 connects the first connection unit 110 and the second connection unit 120.

The short rods 111 are slidably connected to the first connection unit 110. Each short rod 111 comprises a first connection portion 112 formed on an end thereof. The first connection portion 112 comprises an opening. The long rods 121 are slidably connected to the second connection unit 120. Each long rod 121 comprises a second connection portion 122 formed on an end thereof. The second connection portion 122 comprises an opening. The component structure 100 is pivotably connected to other component structures via the first connection portions 112 and the second connection portions 122 to build a decorative structure (architecture).

The main rod 130 is a stud bolt. A distance between the first connection unit 110 and the second connection unit 120 is changeable by sliding (rotating) the first connection unit 110 and the second connection unit 120 on the main rod 130. Short or long rods amounts of each component structure can be three, four or other numbers.

The invention also provides an architecture (decorative structure) comprising a first component structure and a second component structure. The first component structure comprises a first connection unit, at least one first short rod, a second connection unit, at least one first long rod and a first main rod. The first short rod is connected to the first connection unit. The first long rod is connected to the second connection unit. The first main rod connects the first connection unit and the second connection unit. The second component structure comprises a third connection unit, at least one second short rod, a fourth connection unit, at least one second long rod and a second main rod. The second short rod is connected to the third connection unit. The second long rod is connected to the fourth connection unit. The second main rod connects the third connection unit and the fourth connection unit, wherein the first short rod is (pivotably) connected to the second long rod, and the first long rod is (pivotably) connected to the second short rod.

Figure 2A:
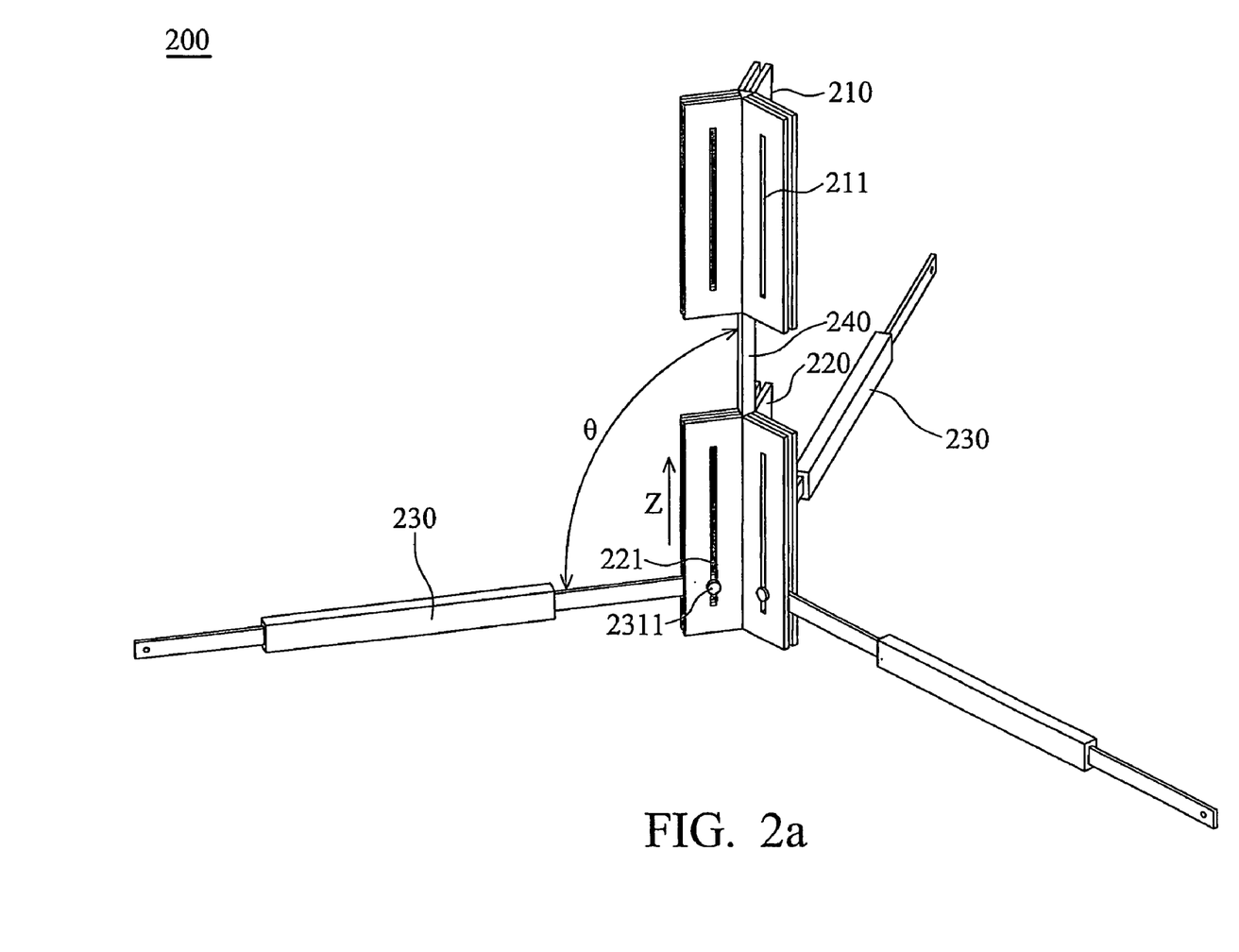
FIG. 2a shows a component structure of a second embodiment of the invention.

FIG. 2a shows a component structure 200 of a second embodiment of the invention, which comprises a first connection unit 210, a second connection unit 220, linkages 230 and a main rod 240. The linkages 230 are connected to the second connection unit 220. The main rod 240 connects the first connection unit 210 and the second connection unit 220.

The first connection unit 210 comprises grooves 211. The second connection unit 220 comprises grooves 221. An end of each linkage 230 pivots in the groove 221 of the second connection unit 220 via bolt 2311. An included angle θ between the linkage 230 and the main rod 240 is changeable by rotating the linkage 230. As well, the end of each linkage 230 can slide in the groove 221 along an axis Z via changing the fixing position of bolt 2311.

Figure 2B:
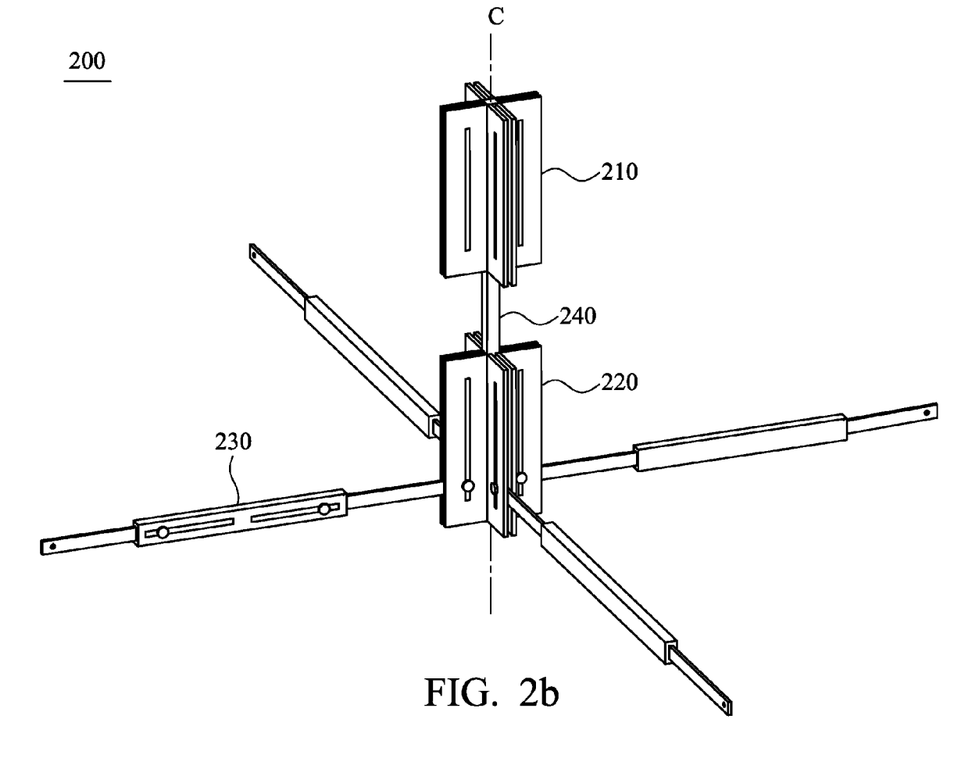
FIG. 2b shows a modified example of the second embodiment of the invention.
Figure 7:
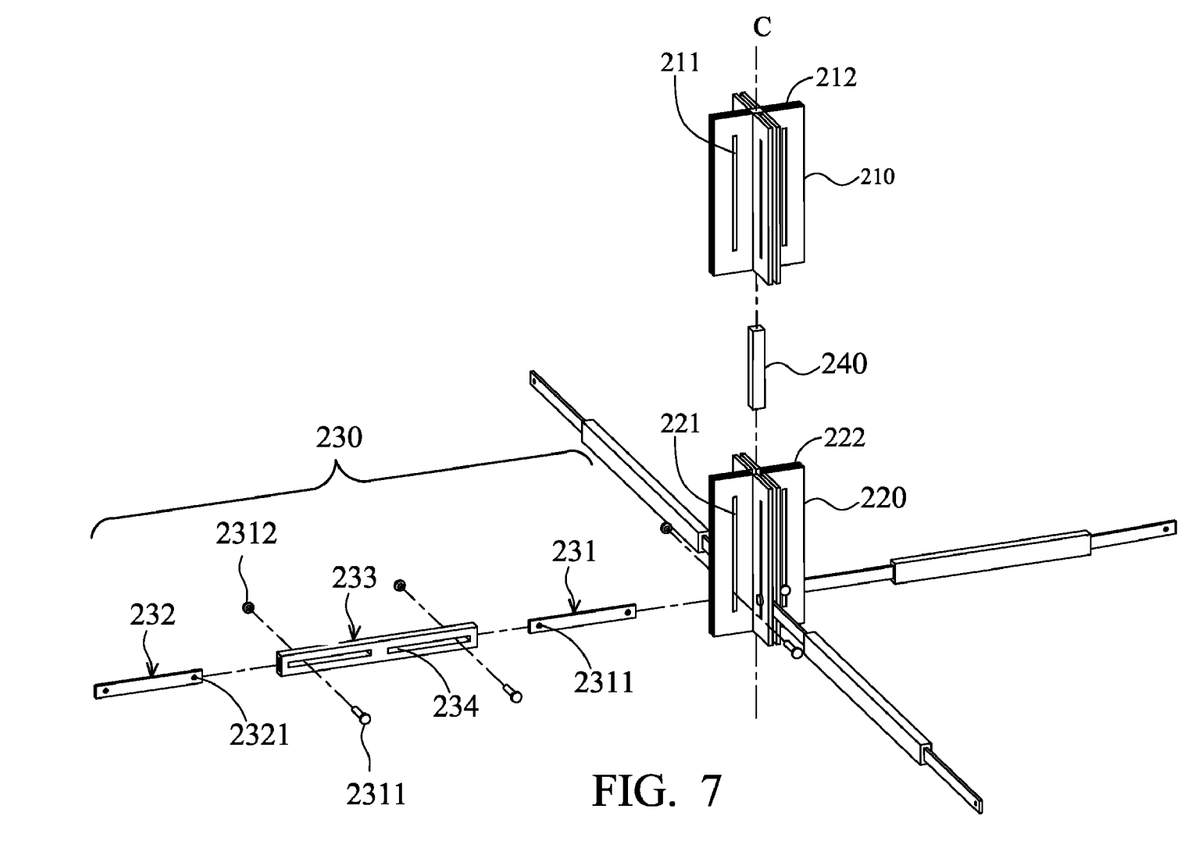
FIG. 7 shows an explosive view of the component structure of FIG. 2b.

Referring to FIGS. 2b, 7, 8a and 8b, wherein FIG. 2b shows a modified embodiment of the component structure 200, and FIG. 7 shows an explosive view of the component structure 200 shown in FIG. 2b. The component structure 200 in FIG. 2b includes a first connection unit 210, a second connection unit 220, four linkages 230, and a main rod 240. The first connection unit 210 and the second connection unit 220 respectively have four sets of parallel plates 212 and 222, wherein the four sets of plates 212 and 222 are connected each other along a common axis C. Each set of plate 212 and 222 have a pair of aligned elongated grooves 211 and 221 extending along the common axis C. The main rod 240 is disposed along the common axis C and is interconnected to the first connection unit 210 and the second connection unit 220 by welding. Each linkage 230 includes a first section 231, a second section 232, a body 233, and a plurality of bolts 2311 and nuts 2312. The first section 231 and the second section 232 respectively have two bore 2313 and 2323 formed at two ends thereof.

Figure 8A:
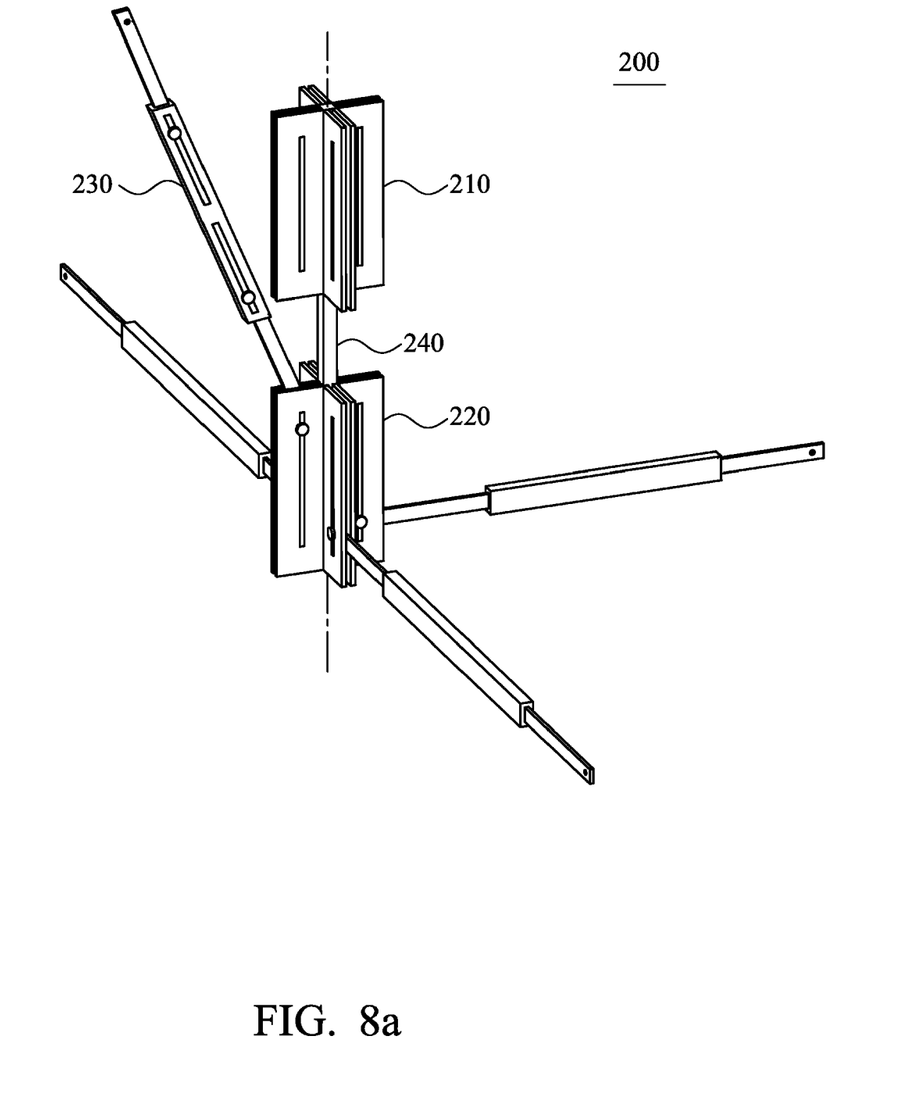
FIGS. 8A-8B show schematic views of the component structure operated in different status.
Figure 8B:
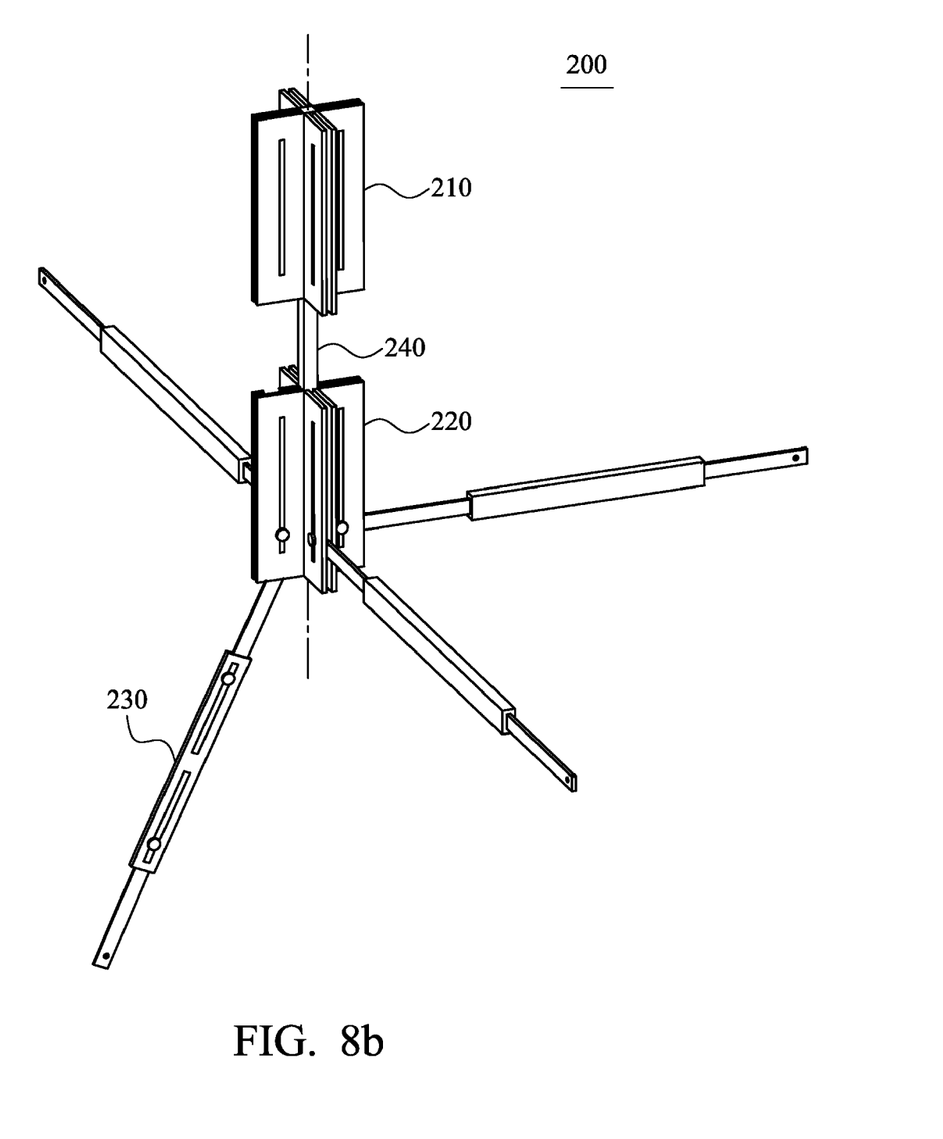

During assembly, one of the bolts 2311 is inserted through the groove 221 and the bore 2313 of the first section 231 and is connected to the nut 2212. Thus, the linkage 230 is received between the parallel plates 222, and the grooves 221 slidably and rotatably receive the opposing end of the bolt 2311 respectively therethrough. More particularly, when the bolt 2311 is adjusted loosely, the linkage 230 is slidable along a Z direction and rotatable on a Y-Z plane, and when the bolt 2311 is adjusted tightly, the position and positioning angle of the linkage 230 is fixed, as shown in FIGS. 8A and 8B. Similarly, the body 233 includes two sets of slots 234, and the bolts 2311 are inserted through the slots 234 and the bores 2313 and 2323 and are connected to the nuts 2212. When the bolts 2311 are adjusted loosely, the first section 231 and the second section 232 are slidable respect to the body 233, and when the bolts 2311 are adjusted tightly, the first section 231 and the second section 232 are fixed thereon.

Figure 3A:
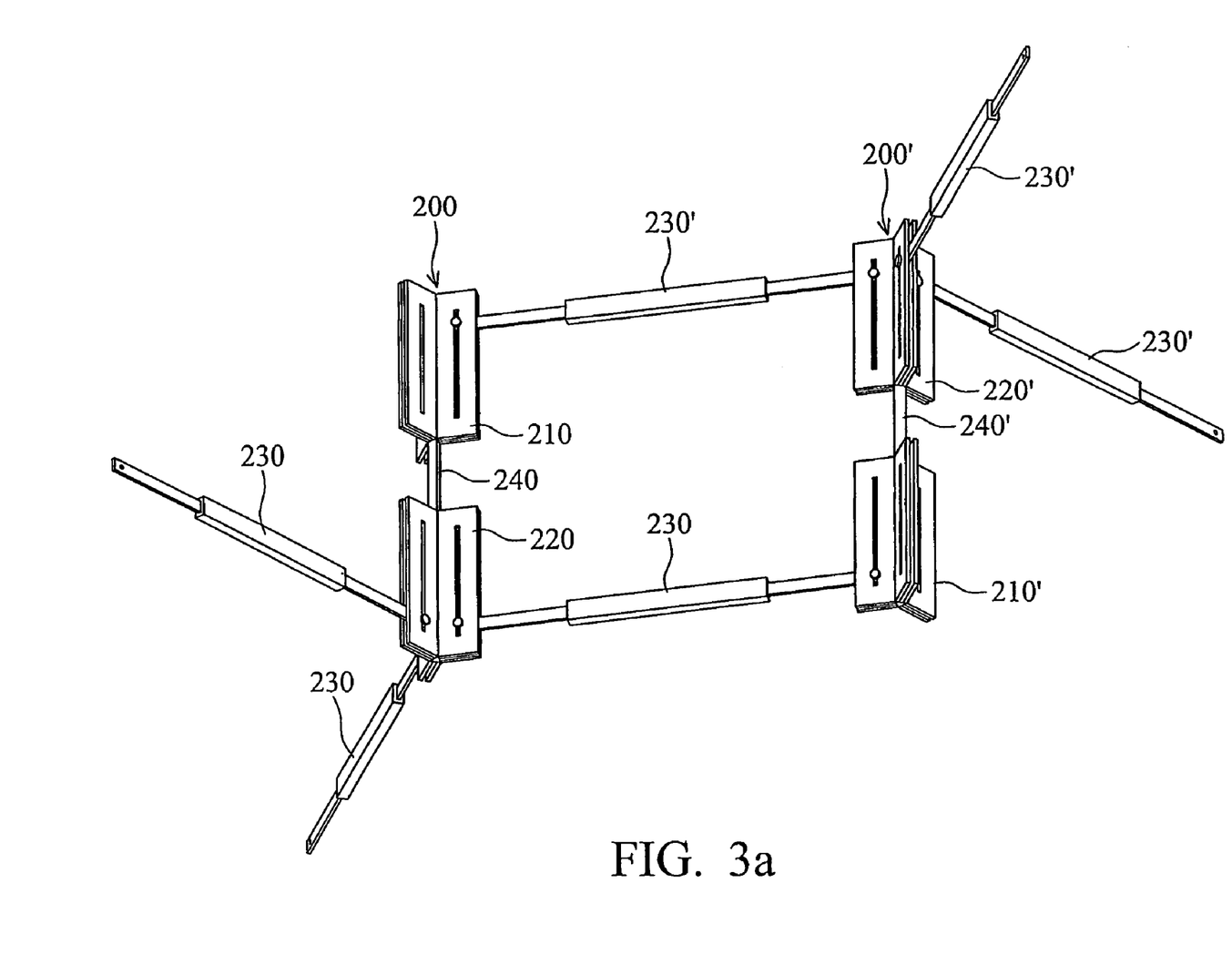
FIG. 3a shows an architecture constituted by the component structure of the second embodiment of the invention.
Figure 3B:
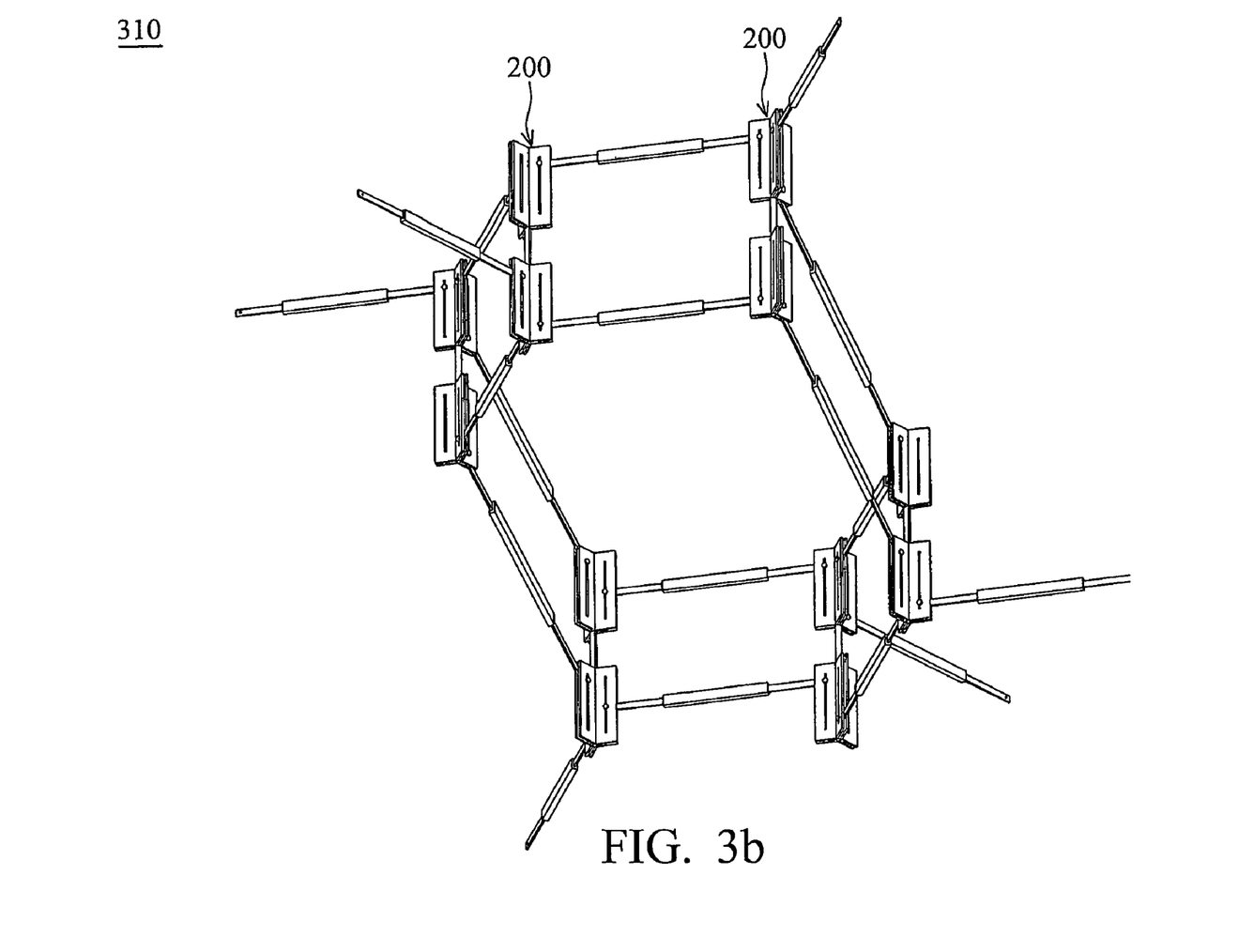
FIG. 3b shows an architecture with curved surface built by the component structure of the second embodiment of the invention.

FIG. 3a shows an architecture (decorative structure) utilizing the second embodiment, which comprises a first component structure 200 and a second component structure 200'. The first component structure 200 comprises a first connection unit 210, a second connection unit 220, first linkages 230 and a first main rod 240. The first linkages 230 are connected to the second connection unit 220. The first main rod 240 connects the first connection unit 210 and the second connection unit 220. The second component structure 200' comprises a third connection unit 210', a fourth connection unit 220', second linkages 230' and a second main rod 240'. The second linkages 230' are connected to the fourth connection unit 220'. The second main rod 240' connects the third connection unit 210' and the fourth connection unit 220'. One of the first linkages 230 connects the second connection unit 220 and the third connection unit 210'. One of the second linkage 230' connects the fourth connection unit 220' and the first connection unit 210. With reference to FIG. 3b, an architecture (decorative structure) 310 with curved surface is formed by a plurality of component structures 200.

Figure 4A:
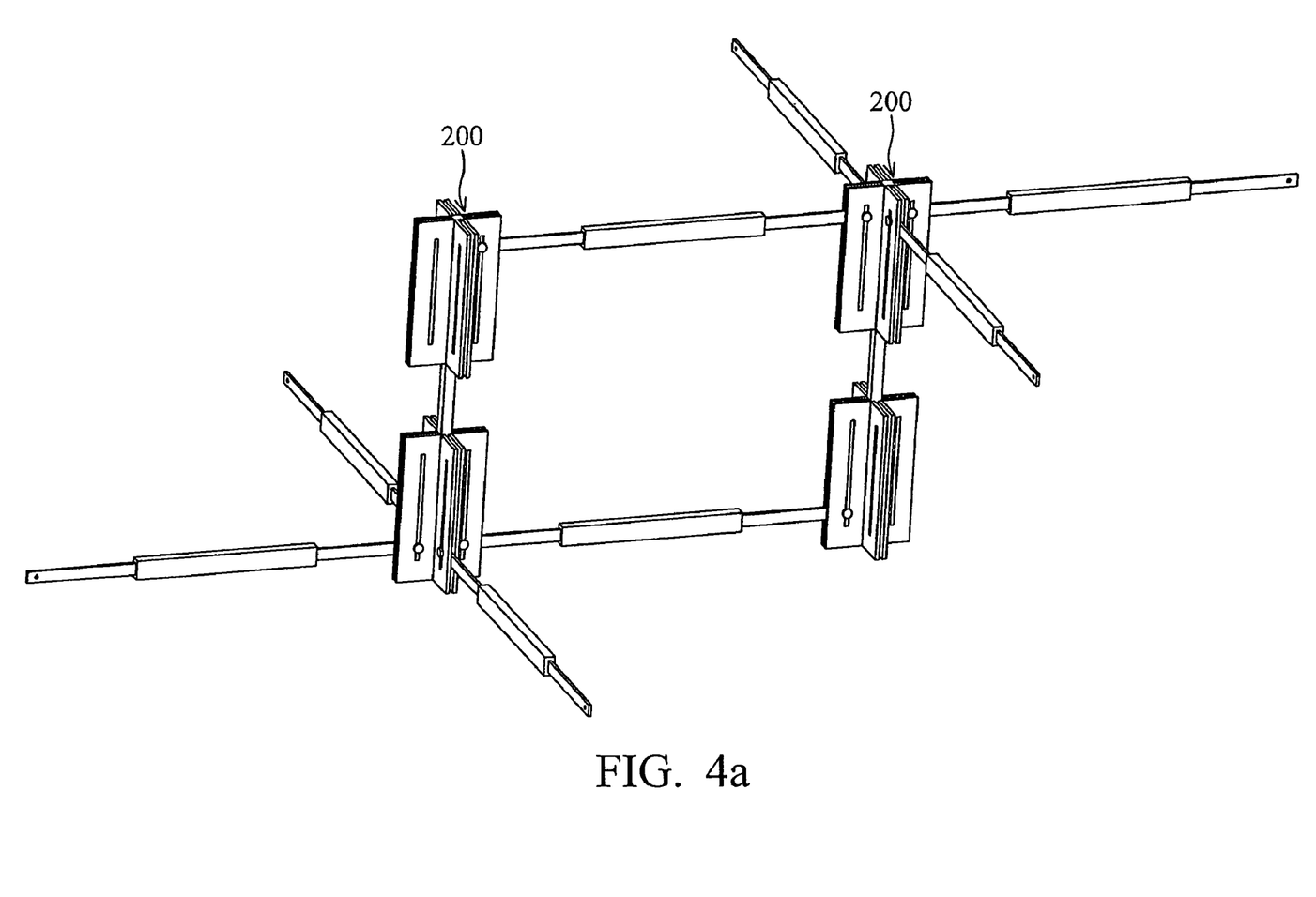
FIG. 4a shows an architecture constituted by the component structure of the modified example of the second embodiment.
Figure 4B:
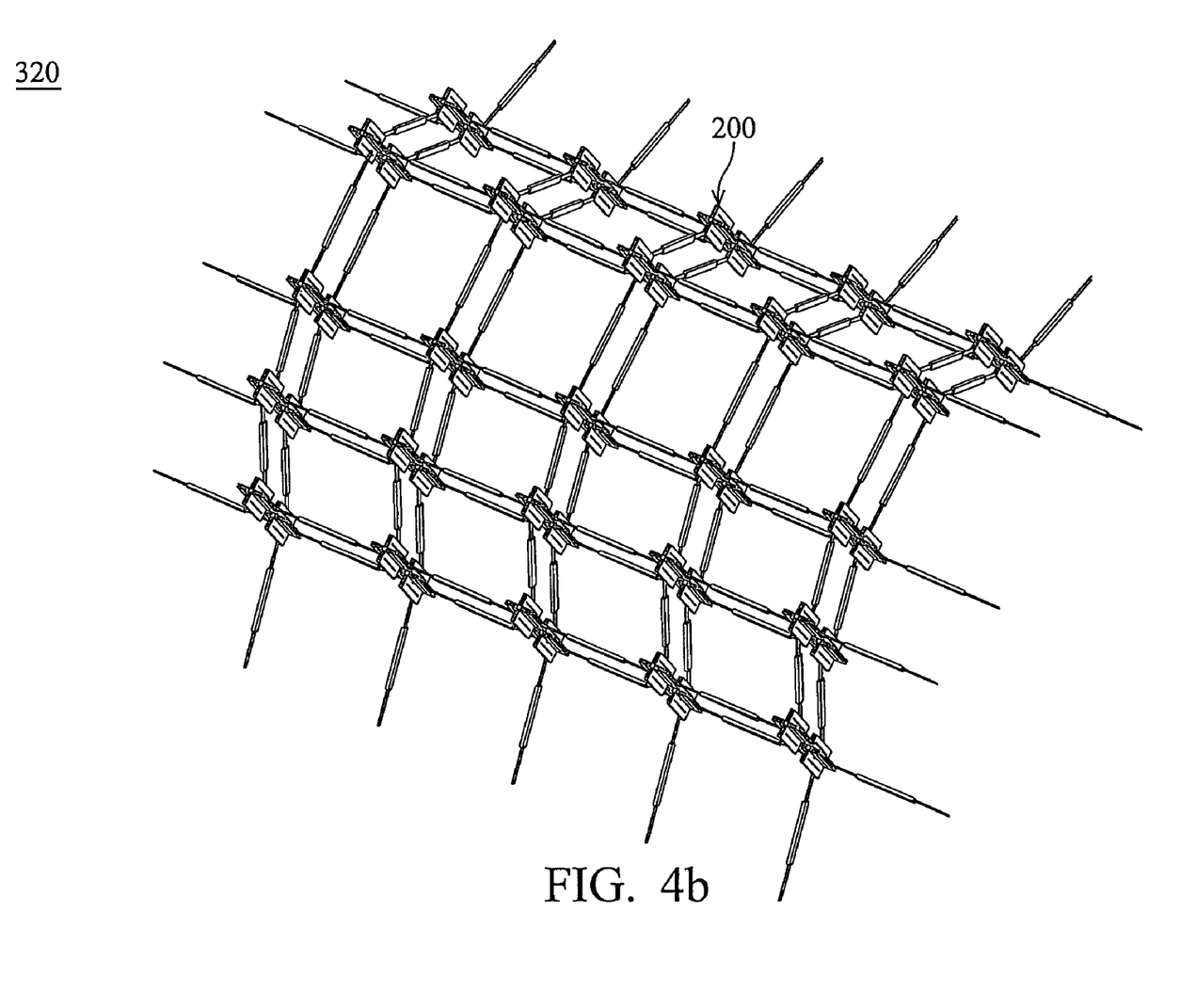
FIG. 4b shows an architecture with curved surface built by the component structure of the modified example of the second embodiment.

FIGS. 4a and 4b show a modified example of the second embodiment, wherein an architecture (decorative structure) 320 with curved surface is formed by a plurality of component structures 200, and each component structures 200 comprises four linkages 230.

Figure 5:
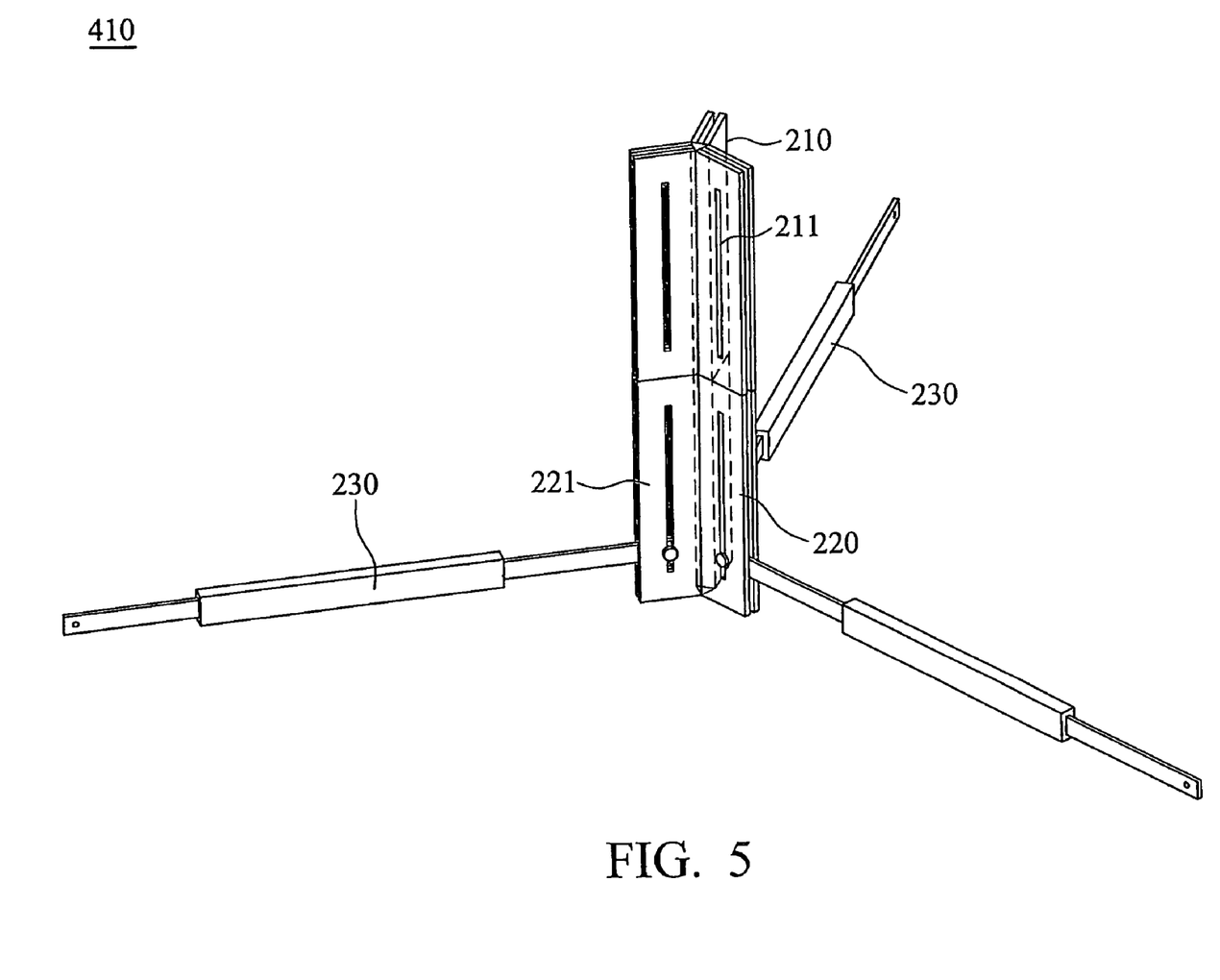
FIG. 5 shows a third embodiment of the invention.

FIG. 5 shows a component structure 410 of a third embodiment of the invention, wherein the main rod 240 is omitted, and the first connection unit 210 is directly connected to the second connection unit 220.

Figure 6:
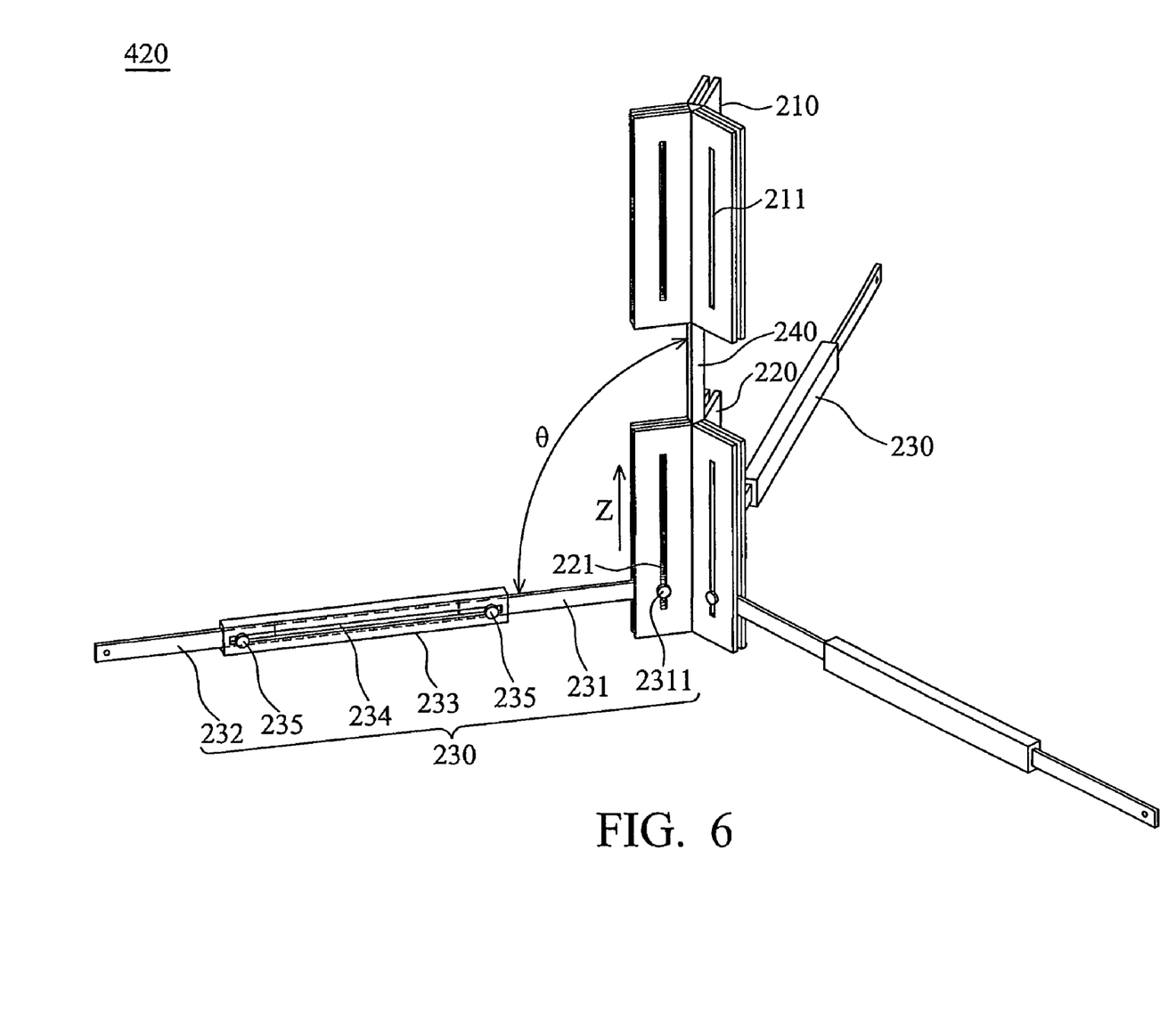
FIG. 6 shows a fourth embodiment of the invention.

FIG. 6 shows a component structure 420 of a fourth embodiment of the invention, wherein the linkage 230 comprises a first section 231, a second section 232 and a body 233. The body 233 comprises slot 234. The first section 231 and the second section 232 are fixed in the slot 234 of the body 233 via bolts 235. A length of the linkage 230 is changeable by move the first section 231 relative to the second section 232 via changing fixing positions of the bolts 235.

The component structure of the invention provides improved freedom in building a decorative structure (architecture). After the decorative structure is accomplished, curves of the decorative structure can still be modified by pivoting the linkages or rods of the invention. Additionally, the linkages or rods are connected to the connection units by bolts. Therefore, there is no elastic fatigue or deterioration problem.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A component structure, comprising:
   a first connection unit;
   a second connection unit;
   a least one bolt;
   at least one linkage, connected to the second connection unit via the bolt; and
   a main rod, connecting the first connection unit and the second connection unit;
   wherein the first connection unit and the second connection unit respectively have plurality of sets of parallel plates connected each other along a common axis;
   wherein each of the parallel plates has a pair of aligned elongated grooves extending parallel to the common axis;
   wherein the linkage is received between the parallel plates, and the grooves slidably and rotatably receive the opposing end of the bolt respectively therethrough.

2. The component structure as claimed in claim 1, wherein the linkage further comprises a bore, and the bolt inserts through the bore so that the linkage pivots on the second connection unit.

3. The component structure as claimed in claim 2, wherein an included angle between the linkage and the main rod is changed by pivoting the linkage.

4. The component structure as claimed in claim 1, wherein the linkage is slidably connected to the second connection unit.

5. The component structure as claimed in claim 1, wherein the linkage comprises a first section and a second section, a length of the linkage is changed by moving the first section relative to the second section.

6. The component structure as claimed in claim 1, wherein the component structure comprises three linkages.

7. The component structure as claimed in claim 1, wherein the component structure comprises four linkages, and the first connection unit and the second connection unit respectively have four sets of parallel plates.

8. The component structure as claimed in claim 7, wherein the four sets of the parallel plates are equally space around the common axis.

9. The component structure as claimed in claim 1, wherein the linkage comprises a first section received in the parallel plates, a second section, and a body interconnected between the first section and the second section, wherein the body comprises a slot and the first section and the second section respectively comprises a bore, wherein the bolts are inserted through the slot and the bores so as to connect the first section, the body, and the second section.

10. The component structure as claimed in claim 1, wherein the main rod is connected to the first section and the second section by welding.

11. An architecture, comprising:
   a first component structure, comprising:
      a first connection unit;
      a second connection unit;
      at least one first linkage, connected to the second connection unit; and
      a first main rod, connecting the first connection unit and the second connection unit;
   a second component structure, comprising:
      a third connection unit;
      a fourth connection unit;
      at least one second linkage, connected to the fourth connection unit; and
      a second main rod, connecting the third connection unit and the fourth connection unit; and
   a plurality of bolts;
   wherein the first linkage connects the second connection unit and the third connection unit via the bolts, and the second linkage connects the fourth connection unit and the first connection unit via the bolts; and
   wherein the first connection unit, the second connection unit, the third connection unit, and the fourth connection unit respectively have a plurality of sets of parallel plates connected each other along a common axis;
   wherein each of the parallel plates has a pair of aligned elongated grooves extending parallel to the common axis;
   wherein the first linkage and the second linkage are received between the parallel plates, and the grooves slidably and rotatably receive the opposing end of the bolt respectively therethrough.

12. A component structure, comprising:
   a first connection unit;
   a second connection unit, connected to the first connection unit;
   a least one bolt; and
   at least one linkage, connected to the second connection unit via the bolt;
   wherein the first connection unit and the second connection unit respectively have plurality of sets of parallel plates connected each other along a common axis;
   wherein each of the parallel plates has a pair of aligned elongated grooves extending parallel to the common axis;
   wherein the linkage is received between the parallel plates, and the grooves slidably and rotatably receive the opposing end of the bolt respectively therethrough.

13. The component structure as claimed in claim 12, wherein the linkage further comprises a bore, and the bolt inserts through the bore so that the linkage pivots on the second connection unit.

14. The component structure as claimed in claim 13, wherein an included angle between the linkage and the second connection unit is changed by pivoting the linkage.

15. The component structure as claimed in claim 12, wherein the linkage is slidably connected to the second connection unit.

16. The component structure as claimed in claim 12, wherein the linkage comprises a first section and a second section, a length of the linkage is changed by moving the first section relative to the second section.

17. The component structure as claimed in claim 12, wherein the component structure comprises three linkages.

18. The component structure as claimed in claim 12, wherein the component structure comprises four linkages, and the first connection unit and the second connection unit respectively have four sets of parallel plates.

19. The component structure as claimed in claim 18, wherein the four sets of the parallel plates are equally space around the common axis.

20. The component structure as claimed in claim 12, wherein the linkage comprises a first section received in the parallel plates, a second section, and a body interconnected between the first section and the second section, wherein the body comprises a slot and the first section and the second section respectively comprises a bore, wherein the bolts are inserted through the slot and the bores so as to connect the first section, the body, and the second section.

21. The component structure as claimed in claim 12, wherein the main rod is connected to the first section and the second section by welding.

* * * * *